United States Patent
Yang

(10) Patent No.: US 11,153,370 B2
(45) Date of Patent: Oct. 19, 2021

(54) RESOURCE SCHEDULING METHOD AND SYSTEM

(71) Applicant: Wangsu Science & Technology Co., Ltd., Shanghai (CN)

(72) Inventor: Zhujue Yang, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/867,433

(22) Filed: May 5, 2020

(65) Prior Publication Data

US 2020/0382582 A1 Dec. 3, 2020

Related U.S. Application Data

(63) Continuation of application No. PCT/CN2019/090318, filed on Jun. 6, 2019.

(30) Foreign Application Priority Data

May 5, 2019 (CN) .......................... 201910368450.9

(51) Int. Cl.
*H04L 29/08* (2006.01)
*H04L 12/24* (2006.01)
*H04L 12/911* (2013.01)

(52) U.S. Cl.
CPC ...... *H04L 67/1002* (2013.01); *H04L 41/0896* (2013.01); *H04L 47/70* (2013.01)

(58) Field of Classification Search
CPC . H04L 67/1002; H04L 41/0896; H04L 47/70; H04L 67/327; H04L 41/04
See application file for complete search history.

(56) References Cited

U.S. PATENT DOCUMENTS

| | | | |
|---|---|---|---|
| 2010/0094950 | A1 | 4/2010 | Zuckerman et al. |
| 2011/0023061 | A1* | 1/2011 | Ji ........................ H04N 21/2385 725/39 |
| 2015/0244769 | A1* | 8/2015 | Khaimov .............. G06F 9/5083 709/217 |

FOREIGN PATENT DOCUMENTS

| | | |
|---|---|---|
| CN | 101127700 A | 2/2008 |
| CN | 101346008 A | 1/2009 |

(Continued)

OTHER PUBLICATIONS

Search Report, Chinese Application No. 201910368450.9, dated Jan. 21, 2020, 8 pgs.

(Continued)

*Primary Examiner* — Joe Chacko
(74) *Attorney, Agent, or Firm* — USCH Law, PC

(57) ABSTRACT

The present disclosure provides a resource scheduling method and system, the method including: periodically collecting, by a resource scheduling system, target client available bandwidths of node servers corresponding to a target client in a target area and a real-time bandwidth demand of the target client in the target area; determining, by the resource scheduling system, a target node server in all the node servers according to the real-time bandwidth demand, bandwidth costs of all the node servers, and the target client available bandwidth; and scheduling, by the resource scheduling system, a service access request of the target client in the target area to the target node server. According to the present disclosure, bandwidth costs of a CDN acceleration service can be effectively reduced, and a use ratio of a bandwidth resource of a node server with relatively low bandwidth costs can also be improved.

17 Claims, 3 Drawing Sheets

(56) References Cited

FOREIGN PATENT DOCUMENTS

| | | | |
|---|---|---|---|
| CN | 102780759 A | 11/2012 |
| CN | 104348647 A | 2/2015 |
| CN | 104580012 A | 4/2015 |
| CN | 104902340 A | 9/2015 |
| CN | 106034083 A | 10/2016 |
| CN | 107124375 A | 9/2017 |
| CN | 107465708 A | 12/2017 |
| CN | 108616401 A | 10/2018 |
| CN | 108845874 A | 11/2018 |
| CN | 108897626 A | 11/2018 |
| CN | 109063978 A | 12/2018 |
| CN | 109067670 A | 12/2018 |
| CN | 109547517 A | 3/2019 |

OTHER PUBLICATIONS

Search Report, Chinese Application No. 201910368450.9, dated Jul. 9, 2020, 8 pgs.
Wangsu Science & Technology Co., Ltd., Office Action, CN 201910368450.9, dated Nov. 3, 2020, 9 pgs.
Wangsu Technology Co., Ltd., International Search Report, PCT/CN2019/090318, dated Feb. 6, 2020, 4 pgs.
Wangsu Science & Technology Co., Ltd., Supplementary European Search Report, EP19874760.2, dated Nov. 20, 2020, 15 pages.

\* cited by examiner

RESOURCE SCHEDULING METHOD AND SYSTEM

CROSS-REFERENCE TO RELATED APPLICATIONS

The present disclosure is a continuation of PCT Application No. PCT/CN2019/090318, entitled "RESOURCE SCHEDULING METHOD AND SYSTEM" and filed Jun. 6, 2019, which claims priority to Chinese Patent Application No. 201910368450.9, entitled "RESOURCE SCHEDULING METHOD AND SYSTEM" and filed May 5, 2019, each of which is incorporated herein by reference in its entirety.

TECHNICAL FIELD

The present disclosure relates to the field of Internet technologies, and in particular, to a resource scheduling method and system.

BACKGROUND

With the continuous development of Internet technologies, an increasing number of service providers (or clients, as referred to in the following) use a content delivery network (CDN) service to accelerate their services. A CDN service provider may allocate bandwidth resources to a client according to a service bandwidth demand of the client.

The CDN service provider usually allocate a plurality of node servers to a client in one or more areas according to an actual service bandwidth of the client, so as to meet the service bandwidth demand of the client. In particular, services of the client may cover one or more areas, and the service bandwidth demand of the client in each area usually has distinct peak period and valley period. In order to meet the service bandwidth demand of the client in each area during the peak period, the CDN service provider may allocate a plurality of node servers to the client in each area according to an actual service bandwidth of the client in each area during the peak period, and distributes a service access request of the client to the plurality of node servers in each area based on a load balancing strategy, so that the plurality of node servers in each area jointly provide necessary bandwidth resources for the services of the client.

The inventor of the present application finds at least the following problems in the existing technology. During valley period of a service bandwidth demand in the each area, since an actual service bandwidth of the client is relatively low, a use ratio of bandwidth resources of the node servers allocated to the client is relatively low. Due to different ways of charging for network traffic, bandwidth costs of different node servers differ from each other. When a node server with relatively high bandwidth costs provides a bandwidth resource for the client, while a node server with relatively low bandwidth costs has a large number of idle bandwidth resources, overall bandwidth costs of the CDN acceleration service may be unnecessarily increased to some extent.

SUMMARY

In order to overcome the problems in the existing technology, embodiments of the present disclosure provide a resource scheduling method and system. The technical solutions are as follows.

According to some embodiments, a resource scheduling method includes:

collecting in cycles, by a resource scheduling system, target client available bandwidths of node servers corresponding to a target client in a target area and a real-time bandwidth demand of the target client in the target area;

determining, by the resource scheduling system, a target node server in the node servers according to the real-time bandwidth demand, bandwidth costs of the node servers, and the target client available bandwidths; and scheduling, by the resource scheduling system, a service access request of the target client in the target area to the target node server.

In some embodiments, the determining, by the resource scheduling system, a target node server in the node servers according to the real-time bandwidth demand, bandwidth costs of the node servers, and the target client available bandwidths includes:

selecting in succession, by the resource scheduling system, bandwidth carrying nodes in the node servers in order of the bandwidth costs from low to high; and when a sum of target client available bandwidths in the selected bandwidth carrying nodes is greater than the real-time bandwidth demand, determining, by the resource scheduling system, the bandwidth carrying nodes as the target node server.

In some embodiments, the method further includes:

when it is detected that an available bandwidth of a first node server in the target area of the target client is less than a preset bandwidth warning threshold, scheduling, by the resource scheduling system, the service access request of the target client in the target area to other node servers than the first node server in the node servers.

In some embodiments, after scheduling, by the resource scheduling system, a service access request of the target client in the target area to the target node server, the method further includes:

when it is detected that an available bandwidth of a bandwidth carrying server in the target area of the target client is less than a preset bandwidth warning threshold, selecting, by the resource scheduling system, a server to be added with a lowest bandwidth cost from other node servers than the target node server in the node servers; and scheduling, by the resource scheduling system, the service access request of the target client in the target area to the target node server and the server to be added.

In some embodiments, after scheduling, by the resource scheduling system, a service access request of the target client in the target area to the target node server, the method further includes:

when it is detected that a growth rate of the real-time bandwidth demand of the target client in the target area is greater than a preset growth threshold, scheduling, by the resource scheduling system, the service access request of the target client in the target area to the node servers corresponding to the target client in the target area.

In some embodiments, determining, by the resource scheduling system, a target node server in the node servers according to the real-time bandwidth demand, bandwidth costs of the node servers, and the target client available bandwidth, includes:

periodically acquiring, by the resource scheduling system, a latest change moment of the bandwidth carrying server of the target client in the target area;

determining, by the resource scheduling system, whether a time interval between the latest change moment and a current moment is greater than a preset time interval; and if yes, determining, by the resource scheduling system, the target node server in the node servers according to the real-time bandwidth demand, the bandwidth costs of the node servers, and the target client available bandwidth.

In some embodiments, determining, by the resource scheduling system, a target node server in the node servers according to the real-time bandwidth demand, bandwidth costs of the node servers, and the target client available bandwidth includes:

if the resource scheduling system determines, according to the real-time bandwidth demand, that a current moment is in a bandwidth demand valley period, determining the target node server in the node servers according to the real-time bandwidth demand, the bandwidth costs of the node servers, and the target client available bandwidth.

In some embodiments, the method further includes:

if the resource scheduling system determines, according to the real-time bandwidth demand, that the current moment is not in the bandwidth demand valley period, gradually adding, other node servers than the target node server corresponding to the target client in the target area, as bandwidth carrying servers of the target client in the target area.

According to some embodiments, a resource scheduling system includes a data collection layer, an analysis and decision-making layer, and a request scheduling layer, where:

the data collection layer is configured to periodically collect target client available bandwidths of node servers corresponding to a target client in a target area and a real-time bandwidth demand of the target client in the target area;

the analysis and decision-making layer is configured to determine a target node server in the node servers according to the real-time bandwidth demand, bandwidth costs of the node servers, and the target client available bandwidth; and the request scheduling layer is configured to schedule a service access request of the target client in the target area to the target node server.

In some embodiments, the analysis and decision-making layer is specifically configured to:

successively select bandwidth carrying nodes in the node servers in order of the bandwidth costs from low to high; and when a sum of target client available bandwidths in the selected bandwidth carrying nodes is greater than the real-time bandwidth demand, determine the bandwidth carrying nodes as the target node server.

In some embodiments, the request scheduling layer is further configured to:

when it is detected that an available bandwidth of a first node server in the target area of the target client is less than a preset bandwidth warning threshold, schedule the service access request of the target client in the target area to other node servers than the first node server in the node servers.

In some embodiments, the request scheduling layer is further configured to:

when it is detected that an available bandwidth of a bandwidth carrying server in the target area of the target client is less than a preset bandwidth warning threshold, select a server to be added with lowest bandwidth costs in other node servers than the target node server in the node servers; and schedule the service access request of the target client in the target area to the target node server and the server to be added.

In some embodiments, the request scheduling layer is further configured to:

when it is detected that a growth rate of the real-time bandwidth demand of the target client in the target area is greater than a preset growth threshold, schedule the service access request of the target client in the target area to the node servers corresponding to the target client in the target area.

In some embodiments, the analysis and decision-making layer is specifically configured to:

periodically acquire a latest change moment of the bandwidth carrying server of the target client in the target area;

determine whether a time interval between the latest change moment and a current moment is greater than a preset time interval; and if yes, determine a target node server in the node servers according to the real-time bandwidth demand, the bandwidth costs of the node servers, and the target client available bandwidth.

In some embodiments, the analysis and decision-making layer is specifically configured to:

determine, when it is determined according to the real-time bandwidth demand that a current moment is in a bandwidth demand valley period, the target node server in the node servers according to the real-time bandwidth demand, the bandwidth costs of the node servers, and the target client available bandwidth.

In some embodiments, the request scheduling layer is further configured to:

gradually add, when the resource scheduling system determines, according to the real-time bandwidth demand, that the current moment is not in the bandwidth demand valley period, other node servers than the target node server corresponding to the target client in the target area, as bandwidth carrying servers of the target client in the target area.

According to some embodiments, a network device includes:

a memory configured to store a program instruction; and a processor configured to call the program instruction stored in the memory to perform the resource scheduling method in the first aspect of the foregoing embodiment according to an acquired program.

According to some embodiments, a computer storage medium stores a computer executable instruction for enabling a computer to perform steps in the method performed by the network device.

Beneficial effects brought by the technical solutions provided in the embodiments of the present disclosure are as follows:

In the embodiments, the resource scheduling system periodically collects target client available bandwidths of node servers corresponding to a target client in a target area, and a real-time bandwidth demand of the target client in the target area; the resource scheduling system determines a target node server in the node servers according to the real-time bandwidth demand, bandwidth costs of the node servers, and the target client available bandwidth; and the resource scheduling system schedules a service access request of the target client in the target area to the target node server. In this way, the resource scheduling system can schedule a service access request of the client in each area to a node server with relatively low bandwidth costs of the client in a corresponding area, and the node server with relatively low bandwidth costs provides bandwidth resources for the business of the client in each area, so that not only bandwidth costs of a CDN acceleration service can be effectively reduced, but also a use ratio of the bandwidth resources of the node server with relatively low bandwidth costs can be effectively improved.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show some embodiments of this application, and those of ordinary skilled in the art may derive other drawings from these accompanying drawings without creative efforts.

DETAILED DESCRIPTION

To make the objectives, technical solutions, and advantages of this application clearer, the following further describes the embodiments of this application in detail with reference to the accompanying drawings.

Figure 1:
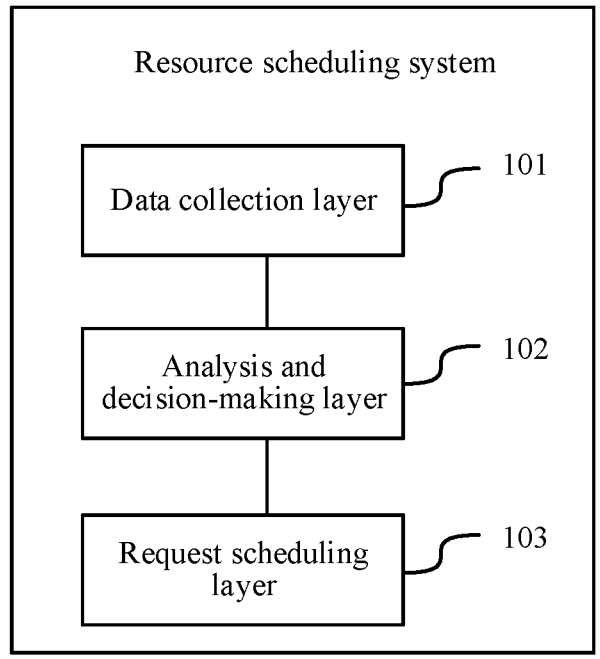
FIG. 1 is a schematic structural diagram of a resource scheduling system according to an embodiment of the present disclosure.

An embodiment of the present disclosure provides a resource scheduling method, and the method may be applied to a resource scheduling system shown in FIG. 1. The resource scheduling system includes a data collection layer, an analysis decision-making layer, and a request scheduling layer. The data collection layer, the analysis and decision-making layer, and the request scheduling layer may be independent servers or different components on a same server, or may be a server cluster constituted by a plurality of servers. The resource scheduling system may schedule a service access request of a client in each area among corresponding node servers in the corresponding area according to target client available bandwidths of node servers corresponding to the client in each area, bandwidth costs, and a real-time bandwidth demand of the client in each area. The data collection layer may collect data required in the foregoing process. The analysis and decision-making layer may analyze and process data collected by the data collection layer. The request scheduling layer may perform corresponding resource scheduling according to an analysis and processing result of the analysis and decision-making layer.

Figure 2:
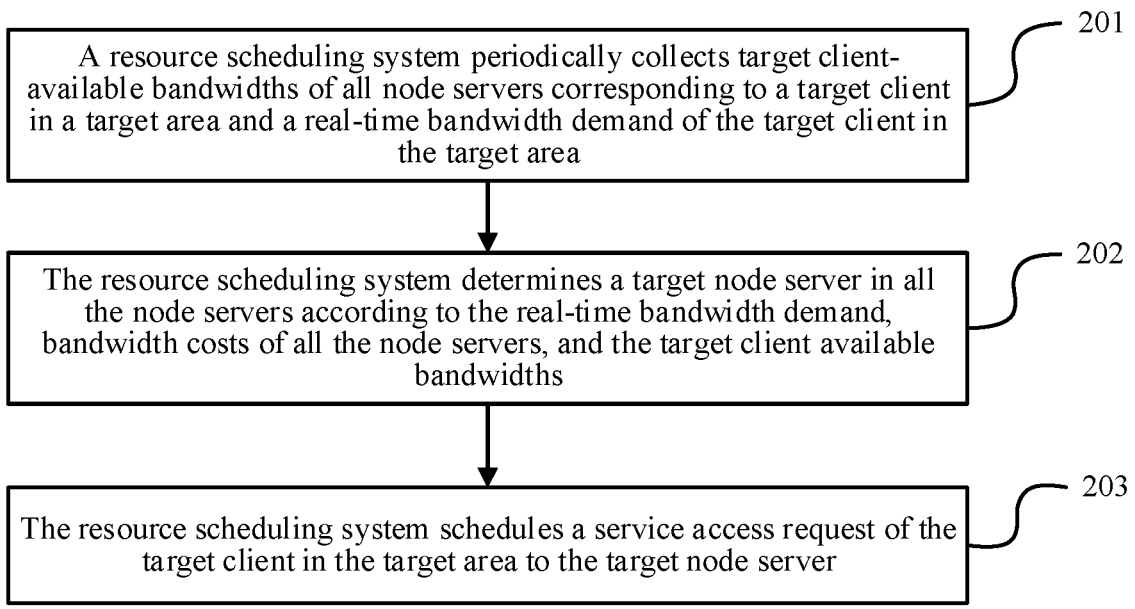
FIG. 2 is a flowchart of a resource scheduling method according to an embodiment of the present disclosure.

A processing procedure of a resource scheduling method shown in FIG. 2 is described in detail as follows with reference to specific embodiments.

Step 201: A resource scheduling system periodically collects target client available bandwidths of node servers corresponding to a target client in a target area and a real-time bandwidth demand of the target client in the target area. In some embodiments, the node servers corresponding to a target client include all of the node servers corresponding to a target client.

During implementation, a CDN service provider may usually provide a network acceleration service for the client through a node server deployed in each area, and may store configuration data such as client information (such as a name of the client and a node server corresponding to the client in each area, etc.), charging information (such as a charging way and a charging coefficient, etc.) of each node server, and a rated bandwidth of each node server, etc. Since the bandwidth resources of each node server may have different degrees of vacancy at different moments, a technician of the CDN service provider may schedule a service access request of the client in each area among the node servers through the resource scheduling system. In particular, the resource scheduling system may periodically acquire the foregoing configuration data such as client information, the charging information of the node server, and the rated bandwidth of the node server, etc. And the resource scheduling system may collect real-time data such as real-time bandwidth data of the client (which may be referred to as a target client) in each area (which may be referred to as a target area), and a real-time bandwidth carrying value of each node server. Afterwards, the resource scheduling system may analyze and process the configuration data and the real-time data, to obtain target client available bandwidths of node servers corresponding to the target client in each target area and total real-time bandwidth data generated by the target client on the node servers corresponding to the target client in the target area, and determines the total real-time bandwidth data as the real-time bandwidth demand of the target client in the target area. The target client available bandwidth consists of a residual bandwidth of the node server and a real-time bandwidth occupied by the target client on the node server. For example, the residual bandwidth of a node server is 500 Mb/s, and the real-time bandwidth occupied by a target client on the node server is 200 Mb/s, and therefore the target client available bandwidth is 700 Mb/s. Herein, the resource scheduling system may further store the foregoing analyzed and processed real-time data in a big data platform, so as to provide a data basis for the CDN service provider to perform other data analysis. Afterwards, the resource scheduling system may schedule the service access request of the target client in the target area according to the target client available bandwidths of node servers and the real-time bandwidth demand of the target client in the target area.

Step 202: The resource scheduling system determines a target node server in the node servers according to the real-time bandwidth demand, bandwidth costs of the node servers, and the target client available bandwidth.

During implementation, the resource scheduling system may determine the bandwidth costs of each node server according to the charging information such as a charging way and a charging coefficient of each node server, and acquires the bandwidth costs of the node servers corresponding to the target client in the target area. Afterwards, the resource scheduling system may determine a node server (which may be referred to as a target node server) for carrying a bandwidth of the target client in the node servers corresponding to the target client in the target area according to the bandwidth costs of the node servers, the target client available bandwidth, and the real-time bandwidth demand of the target client in the target area.

Optionally, the resource scheduling system may preferentially select a node server with relatively low bandwidth costs to carry the bandwidth demand of the client. Correspondingly, step 202 may be performed as follows: the resource scheduling system successively selects bandwidth carrying nodes from the node servers in order of the bandwidth costs from low to high; and when a sum of the target client available bandwidths in the selected bandwidth carrying nodes is greater than the real-time bandwidth demand, the resource scheduling system determines the selected bandwidth carrying nodes as the target node server.

During implementation, after collecting the target client available bandwidths of the node servers corresponding to the target client in the target area, and the real-time bandwidth demand of the target client in the target area, the resource scheduling system may arrange the node servers in descending order of the bandwidth costs, and successively selects the bandwidth carrying nodes from the node servers corresponding to the target client in the target area in order of the bandwidth costs from low to high, and determines whether the sum of the target client available bandwidths of the bandwidth carrying nodes is greater than the real-time bandwidth demand of the target client in the target area. When the sum of the target client available bandwidths of the bandwidth carrying nodes is greater than the real-time bandwidth demand of the target client in the target area, the resource scheduling system may determine the bandwidth carrying nodes as the target node server. It is worth mentioning that when the bandwidth carrying nodes are selected according to the bandwidth costs, if bandwidth costs of a plurality of unselected node servers are identical and are the lowest among bandwidth costs of unselected node servers, the plurality of node servers may also be selected as the bandwidth carrying nodes.

Figure 3:
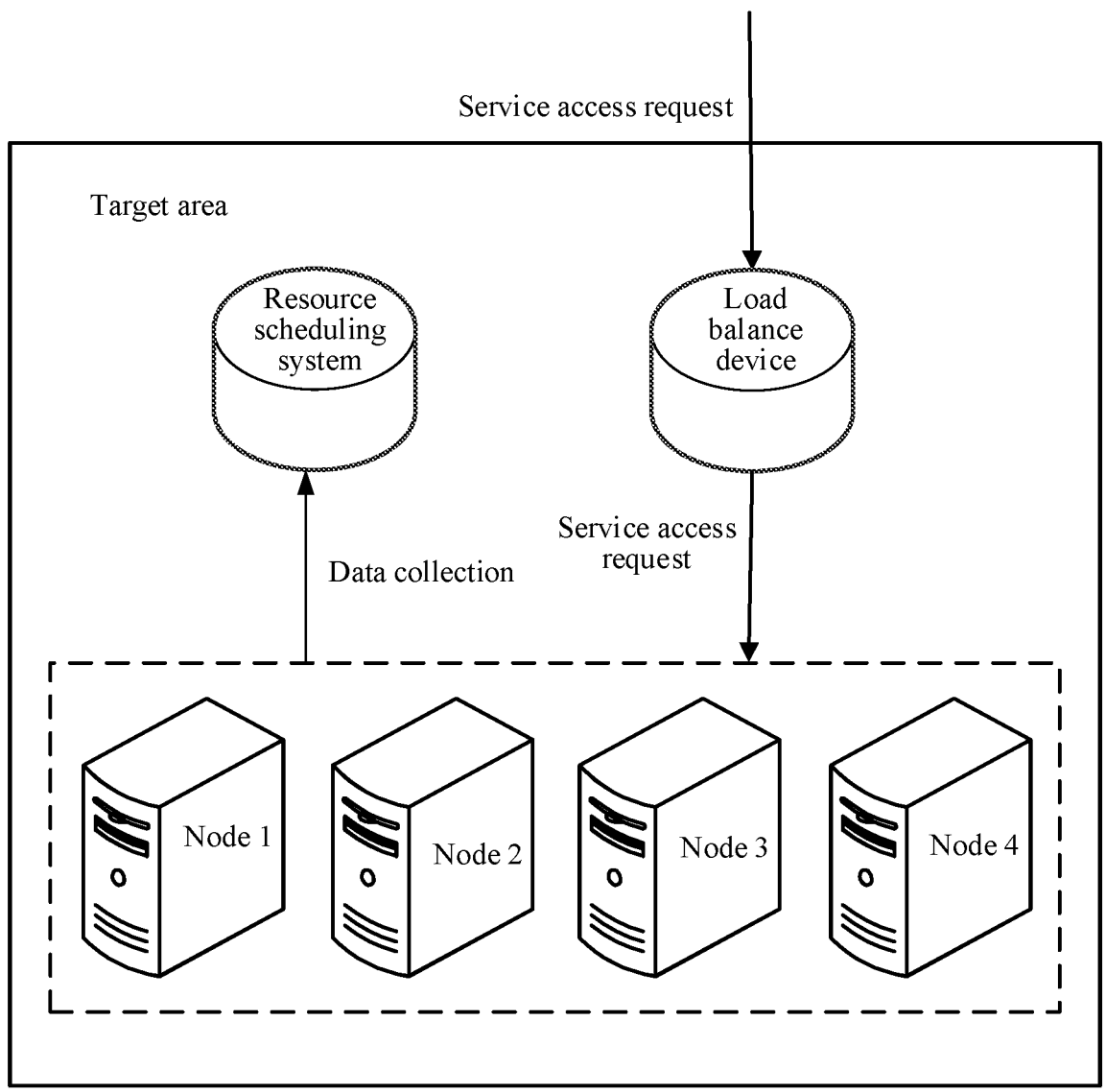
FIG. 3 is a network scenario diagram of a resource scheduling method according to an embodiment of the present disclosure.

In particular, the CDN service provider usually pays fees to an operator according to bandwidth usage of each node server and corresponding charging ways (such as 95th Percentile charging, peak value charging, bandwidth buyout charging, and actual traffic-based charging, etc.). Therefore, for the CDN service provider, a higher charging coefficient causes higher bandwidth costs, and bandwidth costs of a node server used actual traffic-based charging are higher than bandwidth costs of node servers used 95th Percentile charging, peak value charging, and bandwidth buyout charging, etc. For the node servers on which 95th Percentile charging, peak value charging, and bandwidth buyout charging, etc. are performed charging is not according to actual traffic, and therefore bandwidth costs of such node servers may be deemed as equal. As shown in FIG. 3, for example, the node servers corresponding to the target client in the target area (which may be all of the node servers corresponding to the target client in the target area) include: a node 1, for which actual traffic-based charging is used with a charging coefficient of 8.5, a node 2, for which actual traffic-based charging is used with a charging coefficient of 4.8, a node 3, for which 95th Percentile charging is used, and a node 4, for which bandwidth buyout charging is used, and the real-time bandwidth demand of the target client in the target area is 2000 Mb/s. Assuming that a target client available bandwidth of the node 1 is 1000 Mb/s, a target client available bandwidth of the node 2 is 800 Mb/s, a target client available bandwidth of the node 3 is 600 Mb/s, and a target client available bandwidth of the node 4 is 900 Mb/s, the resource scheduling system may arrange these nodes as follows in descending order of the bandwidth costs:

Node 1: for which actual traffic-based charging is used with a charging coefficient of 8.5 and a target client available bandwidth of 1000 Mb/s;

Node 2: for which actual traffic-based charging is used with a charging coefficient of 4.8 and a target client available bandwidth of 800 Mb/s;

Node 3: for which 95th Percentile charging is used and a target client available bandwidth of 600 Mb/s; and Node 4: for which bandwidth buyout charging is used and a target client available bandwidth of 900 Mb/s.

The resource scheduling system may first select node servers with the lowest bandwidth costs, that is, the node 3 and the node 4 as the bandwidth carrying nodes. Since a sum of the target client available bandwidths in the node 3 and the node 4 is 1500 Mb/s, which is less than the real-time bandwidth demand 2000 Mb/s of the target client in the target area, the resource scheduling system may further select the node 2 as the bandwidth carrying node. At this time, a sum of the target client available bandwidths in the node 2, the node 3, and the node 4 is 2300 Mb/s, which is greater than the real-time bandwidth demand 2000 Mb/s of the target client in the target area, and therefore the resource scheduling system may determine the node 2, the node 3, and the node 4 as the target node server, that is, the node 2, the node 3, and the node 4 carry the service access request of the target client in the target area.

Since service quality of the client may be affected or the bandwidth carrying node may carry excessive load if all service access requests of the target client in the target area are scheduled to few bandwidth carrying nodes, a technician of the CDN service provider may set a minimum number (which may be referred to as a minimum number of reserved nodes) of the bandwidth carrying nodes of the target client in the target area through the resource scheduling system. The foregoing example is still used, in which all the node servers corresponding to the target client in the target area include: a node 1, for which actual traffic-based charging is used with a charging coefficient of 8.5, a node 2, for which actual traffic-based charging is used with a charging coefficient of 4.8, a node 3, for which 95th Percentile charging is used, and a node 4, for which bandwidth buyout charging is used, and the real-time bandwidth demand of the target client in the target area is 1000 Mb/s. Assuming that a target client available bandwidth of the node 1 is 1000 Mb/s, a target client available bandwidth of the node 2 is 800 Mb/s, a target client available bandwidth of the node 3 is 600 Mb/s, and a target client available bandwidth of the node 4 is 900 Mb/s, and at least three nodes are reserved, the resource scheduling system may first select three node servers with the lowest bandwidth cost, that is, the node 2, the node 3 and the node 4 selected as the bandwidth carrying nodes. In this case, the node 2, the node 3, and the node 4 can meet the real-time bandwidth demand of the target client in the target area, and therefore the resource scheduling system may determine the node 2, the node 3, and the node 4 as the target node server.

Step 203: The resource scheduling system schedules a service access request of the target client in the target area to the target node server.

Figure 4:
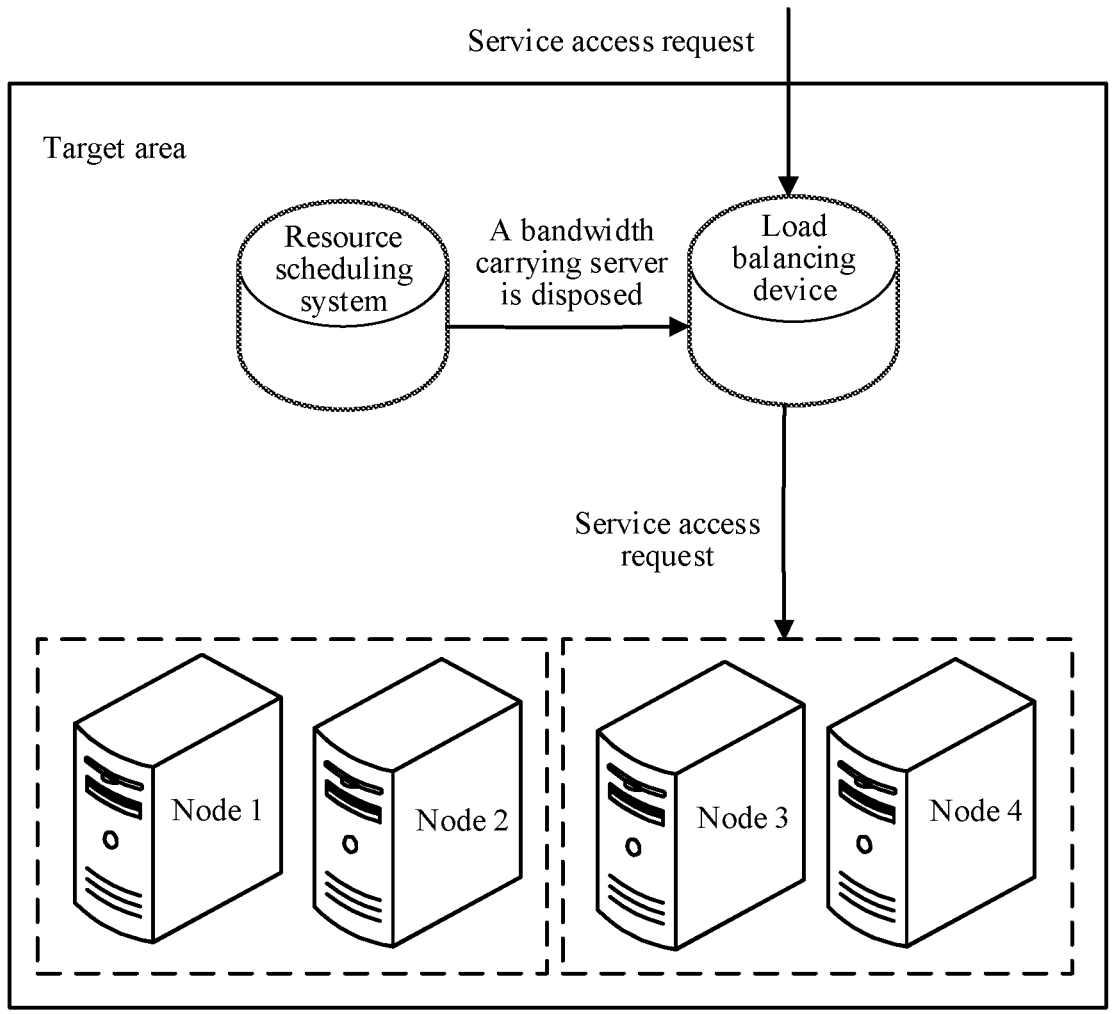
FIG. 4 is a network scenario diagram of a resource scheduling method according to an embodiment of the present disclosure.

During implementation, the resource scheduling system may schedule all service access requests of the target client in the target area to all the target node servers after determining the target node servers. The example is still used, in which all the node servers corresponding to the target client in the target area include a node 1, a node 2, a node 3, and a node 4, and the target node server includes the node 3 and the node 4. The resource scheduling system may allow only the node 3 and the node 4 to jointly provide bandwidth resources required in the real-time bandwidth demand of the target client in the target area, that is, the resource scheduling system may set the bandwidth carrying nodes of the target client in the target client as the node 3 and the node 4 on a load balancing device, which is shown in FIG. 4, so that the load balancing device distributes the service access request of the target client in the target area to the node 3 and the node 4.

Optionally, when a bandwidth carried by a node server is excessive, the resource scheduling system may temporarily stop scheduling the service access request to the node server. Corresponding processing may be as follows: when it is detected that an available bandwidth of a first node server in the target area of the target client is less than a preset bandwidth warning threshold, the resource scheduling system schedules the service access request of the target client in the target area to other node servers than the first node server in all the node servers.

During implementation, since bandwidth costs may be increased when a real-time bandwidth carrying value of a node server is excessively high, the technician of the CDN service provider may set a threshold (which may be referred to as a preset bandwidth warning threshold) for an available bandwidth of each node server through the resource scheduling system. When it is detected that an available bandwidth of a node server (which may be referred to as a first node server) is less than the preset bandwidth warning threshold, the resource scheduling system may temporarily stop scheduling the service access request of the target client in the target area to the first node server, and schedules all the service access requests of the target client in the target area to other node servers than the first node server that are corresponding to the target client in the target area. It may be understood that, bandwidth costs of a node server for which actual traffic-based charging is used increase with an increase of actual traffic, and therefore the preset bandwidth warning threshold may be not set for such type of node server.

Optionally, the resource scheduling system may determine whether to add a bandwidth carrying server according to an available bandwidth of the target node server. Correspondingly, after step 203, processing may be performed as follows: when it is detected that an available bandwidth of a bandwidth carrying server in the target area of the target client is less than a preset bandwidth warning threshold, the resource scheduling system selects a server to be added with lowest bandwidth costs in other node servers than the target node server in all the node servers; and the resource scheduling system schedules the service access request of the target client in the target area to the target node server and the server to be added.

During implementation, the resource scheduling system may detect an available bandwidth of the bandwidth carrying server of the target client in the target area after scheduling the service access request of the target client in the target area. When it is detected that an available bandwidth of a bandwidth carrying server is less than the preset bandwidth warning threshold, the resource scheduling system may select a server to be added with lowest bandwidth costs from other node servers than the target node server that are corresponding to the target client in the target area, and then schedules the service access request of the target client in the target area to the target node server and the server to be added, that is, both the target node server and the server to be added are used as the bandwidth carrying server of the target client in the target area. It is worth mentioning that the selected server to be added may be one node server with the lowest bandwidth costs or a plurality of node servers with the lowest and equal bandwidth costs. Further, if it is detected that an available bandwidth of another bandwidth carrying server is less than the preset bandwidth warning threshold after one time of selection of the server to be added, a server to be added may be selected again from other node servers as the bandwidth carrying server.

Optionally, the resource scheduling system may determine whether to resume rescheduling according to a change rate of the real-time bandwidth demand of the target client in the target area. Correspondingly, after step 203, processing may be performed as follows: when it is detected that a growth rate of the real-time bandwidth demand of the target client in the target area is greater than a preset growth threshold, the resource scheduling system schedules the service access request of the target client in the target area to all the node servers corresponding to the target client in the target area.

During implementation, the resource scheduling system may detect and record, according to a preset detection period, real-time bandwidth carrying values of other node servers than the target node server that are corresponding to the target client in the target area. Accordingly, the resource scheduling system may acquire a real-time bandwidth demand of the target client in the target area during previous one preset detection period and a real-time bandwidth demand of the target client in the target area at a current moment, and calculates a growth rate of the real-time bandwidth demand of the target client in the target area as follows:

$$\text{Growth rate} = \frac{\left( \begin{array}{c} \text{Real-time bandwidth demand} \\ \text{at current moment} \\ \text{Real-time bandwidth demand during} \\ \text{previous one preset detection period} \end{array} \right)}{\text{Real-time bandwidth demand during}} + 1$$
$$\text{previous one preset detection period}$$

Since an excessive growth rate of the real-time bandwidth carrying value of the target client in the target area may cause frequent scheduling, the technician of the CDN service provider may set a maximum value (which may be referred to as a preset growth threshold) for a growth rate of a real-time bandwidth carrying value between adjacent preset detection periods for the target client in the target area through the resource scheduling system. When the resource scheduling system detects that the growth rate is greater than the preset growth threshold, the resource scheduling system may schedule the service access request of the target client in the target area to all the node servers corresponding to the target client in the target area.

Optionally, the resource scheduling system may set a minimum time interval between two changes of a bandwidth carrying server of one client in one area. Correspondingly, step 202 may be processed as follows: the resource scheduling system periodically acquires a latest change moment of the bandwidth carrying server of the target client in the target area; the resource scheduling system determines whether a time interval between the latest change moment and a current moment is greater than a preset time interval; and if yes, the resource scheduling system determines the target node server in all the node servers according to the real-time bandwidth demand, the bandwidth costs of all the node servers, and the target client available bandwidth.

During implementation, in order to prevent frequent changes of the bandwidth carrying server of the target client in the target area, the technician of the CDN service provider may record a change moment of the bandwidth carrying server of the target client in the target area through the resource scheduling system, and sets a minimum time interval (which may be referred to as a preset time interval) for two adjacent changes of the bandwidth carrying server of the target client in the target area. Accordingly, the resource scheduling system may acquire the latest change moment of the bandwidth carrying server of the target client in the target area, and calculate the time interval between the latest change moment and the current moment, and determines whether the time interval is greater than the preset time interval. If yes, the resource scheduling system may determine the target node server in all the node servers according to the real-time bandwidth demand, the bandwidth costs of all the node servers, and the target client available bandwidth. Otherwise, the resource scheduling system may not re-determine the target node server. It may be understood that the preset time interval is inevitably greater than the period in the step 201. Therefore, in the foregoing method, the bandwidth carrying server is prevented from being removed in only a short time after the bandwidth carrying server is added, so that a resource waste due to repeated scheduling is effectively prevented.

Optionally, the resource scheduling system may remove or reduce the bandwidth carrying server only in a bandwidth demand valley period. Correspondingly, step 202 may be processed as follows: if the resource scheduling system determines, according to the real-time bandwidth demand, that a current moment is in a bandwidth demand valley period, the target node server is determined from all the node servers according to the real-time bandwidth demand, the bandwidth costs of all the node servers, and the target client available bandwidth.

During implementation, after collecting the real-time bandwidth demand of the target client in the target area, the resource scheduling system may first determine, according to the real-time bandwidth demand, whether the current moment is in the bandwidth demand valley period. If the current moment is in the bandwidth demand valley period, the resource scheduling system may determine the target node server in all the node servers according to the real-time bandwidth demand, the bandwidth costs of all the node servers, and the target client available bandwidth, and schedules the service access request of the target client to all the node servers corresponding to the target client in the target area. If the current moment is not in the bandwidth demand valley period, the bandwidth carrying server of the target client in the target area may be kept, or a previously removed bandwidth carrying server may be recovered. It should be noted that the technician of the CDN service provider may also input a resource scheduling recovery instruction of the target client in the target area through a UI interface of the resource scheduling system according to an actual bandwidth demand of the target client. Afterwards, the resource scheduling system may also schedule the service access request of the target client to all node servers specified in the resource scheduling recovery instruction.

Optionally, the resource scheduling system may add a bandwidth carrying server in a non-bandwidth demand valley period and perform corresponding processing as follows: if the resource scheduling system determines, according to the real-time bandwidth demand, that the current moment is not in the bandwidth demand valley period, other node servers than the target node server that are corresponding to the target client in the target area are gradually added as bandwidth carrying servers of the target client in the target area.

During implementation, if the resource scheduling system determines that the current moment is not in the bandwidth demand valley period after collecting the real-time bandwidth demand of the target client in the target area, the resource scheduling system may recover the previously removed bandwidth carrying server of the target client in the target area, that is, the resource scheduling system may gradually add other node servers than the target node serve corresponding to the target client in the target area, as the bandwidth carrying servers of the target client in the target area. It is worth mentioning that gradual adding herein may refer to adding a specified number of bandwidth carrying servers at a fixed time interval.

In this embodiment, the resource scheduling system periodically collects target client available bandwidths of all node servers corresponding to a target client in a target area and the real-time demand of the target client in the target area; the resource scheduling system determines a target node server in all the node servers according to the real-time bandwidth demand, bandwidth costs of all the node servers, and the target client available bandwidths; and the resource schedule system schedules a service access request of the target client in the target area to the target node server. In this way, the resource scheduling system can schedule the service access request of the client in each area to a node server with relatively low bandwidth costs of the client in a corresponding area, and the node server with relatively low bandwidth costs provides bandwidth resources required for a service of the client in each area, so that not only bandwidth costs of a CDN acceleration service can be effectively reduced, but also a use ratio of the bandwidth resources of the node server with relatively low bandwidth costs can be effectively improved.

Based on a same technical concept, an embodiment of the present disclosure further provides a resource scheduling system. As shown in FIG. 1, the system includes a data collection layer 101, an analysis and decision-making layer 102, and a request scheduling layer 103.

The data collection layer 101 is configured to periodically collect target client available bandwidths of node servers corresponding to a target client in a target area and a real-time bandwidth demand of the target client in the target area.

The analysis and decision-making layer 102 is configured to determine a target node server in the node servers according to the real-time bandwidth demand, bandwidth costs of all the node servers, and the target client available bandwidth.

The request scheduling layer 103 is configured to schedule a service access request of the target client in the target area to the target node server.

Optionally, the analysis and decision-making layer 102 is specifically configured to:

successively select bandwidth carrying nodes in all the node servers in order of the bandwidth costs from low to high; and when a sum of target client available bandwidths in the selected bandwidth carrying nodes is greater than the real-time bandwidth demand, determine the selected bandwidth carrying nodes as the target node server.

Optionally, the request scheduling layer 103 is further configured to:

when it is detected that an available bandwidth of a first node server in the target area of the target client is less than a preset bandwidth warning threshold, schedule the service access request of the target client in the target area to other node servers than the first node server of all the node servers.

Optionally, the request scheduling layer 103 is further configured to:

when it is detected that an available bandwidth of a bandwidth carrying server of the target client in the target area is less than a preset bandwidth warning threshold, select a server to be added with lowest bandwidth costs in other node servers than the target node server of all the node servers; and schedule the service access request of the target client in the target area to the target node server and the server to be added.

Optionally, the request scheduling layer 103 is further configured to:

when it is detected that a growth rate of the real-time bandwidth demand of the target client in the target area is greater than a preset growth threshold, schedule the service access request of the target client in the target area to all the node servers corresponding to the target client in the target area.

Optionally, the analysis and decision-making layer 102 is specifically configured to:

periodically acquire a latest change moment of the bandwidth carrying server of the target client in the target area;

determine whether a time interval between the latest change moment and a current moment is greater than a preset time interval; and determine, if yes, a target node server in all the node servers according to the real-time bandwidth demand, the bandwidth costs of all the node servers, and the target client available bandwidth.

Optionally, the analysis and decision-making layer 102 is specifically configured to:

Determine, when it is determined according to the real-time bandwidth demand that a current moment is in a bandwidth demand valley period, the target node server in all the node servers according to the real-time bandwidth demand, the bandwidth costs of all the node servers, and the target client available bandwidth.

Optionally, the request scheduling layer 103 is further configured to:

when the resource scheduling system determines, according to the real-time bandwidth demand, that the current moment is not in the bandwidth demand valley period, gradually add other node servers than the target node server corresponding to the target client in the target area, as bandwidth carrying servers of the target client in the target area.

In this embodiment, the resource scheduling system periodically collects target client available bandwidths of node servers corresponding to a target client in a target area and a real-time demand of the target client in the target area; the resource scheduling system determines a target node server in all the node servers according to the real-time bandwidth demand, bandwidth costs of all the node servers, and the target client available bandwidths; and the resource schedule system schedules a service access request of the target client in the target area to the target node server. In this way, the resource scheduling system can schedule the service access request of the client in each area to a node server with relatively low bandwidth costs of the client in a corresponding area, and the node server with relatively low bandwidth costs provides bandwidth resources required for a service of the client in each area, so that not only bandwidth costs of a CDN acceleration service can be effectively reduced, but also a use ratio of the bandwidth resources of the node server with relatively low bandwidth costs can be effectively improved.

Figure 5:
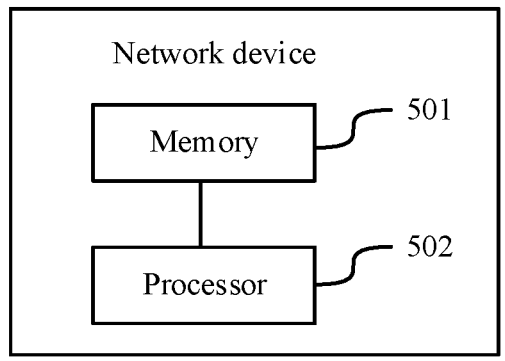
FIG. 5 is a schematic structural diagram of a network device according to an embodiment of the present disclosure.

As shown in FIG. 5, an embodiment of the present disclosure further provides a network device, including:

a memory 501 configured to store a program instruction; and a processor 502 configured to call the program instruction stored in the memory to perform the resource scheduling method in step 201 to step 203 of the foregoing embodiment according to an acquired program.

An embodiment of the present disclosure further provides a computer storage medium, the computer storage medium storing a computer executable instruction for enabling a computer to perform steps in the method performed by the network device in the foregoing embodiment.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of this application, but are not intended to limit this application. Any modification, equivalent replacement, or improvement made in the spirit and principle of this application shall fall in the protection scope of this application.

What is claimed is:

1. A resource scheduling method, comprising:
collecting in cycles, by a resource scheduling system, target client available bandwidths of node servers corresponding to a target client in a target area and a real-time bandwidth demand of the target client in the target area;
determining, by the resource scheduling system, a target node server in the node servers according to the real-time bandwidth demand, bandwidth costs of the node servers, and the target client available bandwidth; and
scheduling, by the resource scheduling system, a service access request of the target client in the target area to the target node server;
wherein determining, by the resource scheduling system, a target node server in the node servers according to the real-time bandwidth demand, bandwidth costs of the node servers, and the target client available bandwidth comprises:
selecting in succession, by the resource scheduling system, bandwidth carrying nodes in the node servers in order of the bandwidth costs from low to high;
when a sum of target client available bandwidths in selected bandwidth carrying nodes is greater than the real-time bandwidth demand, determining, by the resource scheduling system, the bandwidth carrying nodes as the target node server.

2. The method according to claim 1, further comprising:
when it is detected that an available bandwidth of a first node server in the target area of the target client is less than a preset bandwidth warning threshold, scheduling, by the resource scheduling system, the service access request of the target client in the target area to other node servers than the first node server in the node servers.

3. The method according to claim 1, wherein after scheduling, by the resource scheduling system, a service access request of the target client in the target area to the target node server, the method further comprises:
when it is detected that an available bandwidth of a bandwidth carrying server in the target area of the target client is less than a preset bandwidth warning threshold, selecting, by the resource scheduling system, a server to be added with a lowest bandwidth cost in other node servers than the target node server in the node servers; and scheduling, by the resource scheduling system, the service access request of the target client in the target area to the target node server and the server to be added.

4. The method according to claim 1, wherein after scheduling, by the resource scheduling system, a service access request of the target client in the target area to the target node server, the method further comprises:

when it is detected that a growth rate of the real-time bandwidth demand of the target client in the target area is greater than a preset growth threshold, scheduling, by the resource scheduling system, the service access request of the target client in the target area to all the node servers corresponding to the target client in the target area.

5. The method according to any of claim 1, wherein determining, by the resource scheduling system, a target node server in the node servers according to the real-time bandwidth demand, bandwidth costs of the node servers, and the target client available bandwidth comprises:

acquiring in cycles, by the resource scheduling system, a latest change moment of the bandwidth carrying server of the target client in the target area;

determining, by the resource scheduling system, whether a time interval between the latest change moment and a current moment is greater than a preset time interval; and if yes, determining, by the resource scheduling system, the target node server in the node servers according to the real-time bandwidth demand, the bandwidth costs of the node servers, and the target client available bandwidth.

6. The method according to claim 1, wherein the determining, by the resource scheduling system, a target node server in the node servers according to the real-time bandwidth demand, bandwidth costs of the node servers, and the target client available bandwidth comprises:

if the resource scheduling system determines, according to the real-time bandwidth demand, that a current moment is in a bandwidth demand valley period, determining the target node server in the node servers according to the real-time bandwidth demand, the bandwidth costs of the node servers, and the target client available bandwidth.

7. The method according to claim 6, wherein, the method further comprises:

if the resource scheduling system determines, according to the real-time bandwidth demand, that the current moment is not in the bandwidth demand valley period, adding step by step, other node servers than the target node server corresponding to the target client in the target area, as bandwidth carrying servers of the target client in the target area.

8. The method according to claim 1, wherein collecting in cycles, by a resource scheduling system, target client available bandwidths of node servers corresponding to a target client in a target area and a real-time bandwidth demand of the target client in the target area comprises:

acquiring in cycles, by a resource scheduling system, configuration data, the configuration data including client information, charging information of each node server and a rated bandwidth of each node server;

collecting, by a resource scheduling system, real-time data; the real-time data comprising real-time bandwidth data of the target client in the target area, and a real-time bandwidth carrying value of each node server;

obtaining, by a resource scheduling system, the target client available bandwidths of the node servers corresponding to the target client in each target area and total real-time bandwidth data generated by the target client on the node servers in the target area, by analyzing and processing the configuration data and the real-time data; and determining the total real-time bandwidth data as the real-time bandwidth demand of the target client in the target area;

wherein determining, by the resource scheduling system, a target node server in the node servers according to the real-time bandwidth demand, bandwidth costs of the node servers, and the target client available bandwidth comprises:

determining, by a resource scheduling system, the bandwidth costs of each node server according to the charging information of each node server, to acquire the bandwidth costs of the node servers corresponding to the target client in the target area; and determining the target node server for carrying a bandwidth of the target client in the node servers corresponding to the target client in the target area according to the bandwidth costs of the node servers, the target client available bandwidths of the node servers, and the real-time bandwidth demand of the target client in the target area.

9. A network device, comprising:

at least one processor; and a memory communicably connected with the at least one processor for storing instructions executable by the at least one processor, wherein the instructions, when executed by the at least one processor, cause the at least one processor to perform a resource scheduling method comprising:

collecting in cycles, by a resource scheduling system, target client available bandwidths of node servers corresponding to a target client in a target area and a real-time bandwidth demand of the target client in the target area;

determining, by the resource scheduling system, a target node server in the node servers according to the real-time bandwidth demand, bandwidth costs of the node servers, and the target client available bandwidth; and scheduling, by the resource scheduling system, a service access request of the target client in the target area to the target node server;

wherein determining, by the resource scheduling system, a target node server in the node servers according to the real-time bandwidth demand, bandwidth costs of the node servers, and the target client available bandwidth comprises:

selecting in succession, by the resource scheduling system, bandwidth carrying nodes in the node servers in order of the bandwidth costs from low to high;

when a sum of target client available bandwidths in selected bandwidth carrying nodes is greater than the real-time bandwidth demand, determining, by the resource scheduling system, the bandwidth carrying nodes as the target node server.

10. The network device according to claim 9, wherein the method further comprises:

when it is detected that an available bandwidth of a first node server in the target area of the target client is less than a preset bandwidth warning threshold, scheduling, by the resource scheduling system, the service access request of the target client in the target area to other node servers than the first node server in the node servers.

11. The network device according to claim 9, wherein after scheduling, by the resource scheduling system, a service access request of the target client in the target area to the target node server, the method further comprises:
when it is detected that an available bandwidth of a bandwidth carrying server in the target area of the target client is less than a preset bandwidth warning threshold, selecting, by the resource scheduling system, a server to be added with a lowest bandwidth cost in other node servers than the target node server in the node servers; and
scheduling, by the resource scheduling system, the service access request of the target client in the target area to the target node server and the server to be added.

12. The network device according to claim 9, wherein after scheduling, by the resource scheduling system, a service access request of the target client in the target area to the target node server, the method further comprises:
when it is detected that a growth rate of the real-time bandwidth demand of the target client in the target area is greater than a preset growth threshold, scheduling, by the resource scheduling system, the service access request of the target client in the target area to all the node servers corresponding to the target client in the target area.

13. The network device according to claim 9, wherein the target node server in the node servers is determined by the resource scheduling system according to the real-time bandwidth demand, bandwidth costs of the node servers, and the target client available bandwidth when it is determined that a time interval between a latest change moment of a bandwidth carrying server of the target client in the target area and a current moment is greater than a preset time interval;
wherein the latest change moment is periodically acquired by the resource scheduling system.

14. The network device according to claim 9, wherein determining, by the resource scheduling system, a target node server in the node servers according to the real-time bandwidth demand, bandwidth costs of the node servers, and the target client available bandwidth comprises:
if the resource scheduling system determines, according to the real-time bandwidth demand, that a current moment is in a bandwidth demand valley period, determining the target node server in the node servers according to the real-time bandwidth demand, the bandwidth costs of the node servers, and the target client available bandwidth.

15. The network device according to claim 14, wherein, the method further comprises:
if the resource scheduling system determines, according to the real-time bandwidth demand, that the current moment is not in the bandwidth demand valley period, adding step by step, other node servers than the target node server corresponding to the target client in the target area, as bandwidth carrying servers of the target client in the target area.

16. The method according to claim 9, wherein collecting in cycles, by a resource scheduling system, target client available bandwidths of node servers corresponding to a target client in a target area and a real-time bandwidth demand of the target client in the target area comprises:
acquiring in cycles, by a resource scheduling system, configuration data; the configuration data comprising client information, charging information of each node server and a rated bandwidth of each node server;
collecting, by a resource scheduling system, real-time data, the real-time data comprising real-time bandwidth data of the target client in the target area, and a real-time bandwidth carrying value of each node server;
obtaining, by a resource scheduling system, the target client available bandwidths of the node servers corresponding to the target client in each target area and total real-time bandwidth data generated by the target client on the node servers in the target area, by analyzing and processing the configuration data and the real-time data; and
determining the total real-time bandwidth data as the real-time bandwidth demand of the target client in the target area;
wherein determining, by the resource scheduling system, a target node server in the node servers according to the real-time bandwidth demand, bandwidth costs of the node servers, and the target client available bandwidth comprises:
determining, by a resource scheduling system, the bandwidth costs of each node server according to the charging information of each node server, to acquire the bandwidth costs of the node servers corresponding to the target client in the target area; and
determining the target node server for carrying a bandwidth of the target client in the node servers corresponding to the target client in the target area according to the bandwidth costs of the node servers, the target client available bandwidths of the node servers, and the real-time bandwidth demand of the target client in the target area.

17. A non-transitory computer readable storage medium configured to store a computer program, wherein the computer program when executed by a processor, implements a resource scheduling method comprising:
collecting in cycles, by a resource scheduling system, target client available bandwidths of node servers corresponding to a target client in a target area and a real-time bandwidth demand of the target client in the target area;
determining, by the resource scheduling system, a target node server in the node servers according to the real-time bandwidth demand, bandwidth costs of the node servers, and the target client available bandwidth; and
scheduling, by the resource scheduling system, a service access request of the target client in the target area to the target node server;
wherein determining, by the resource scheduling system, a target node server in the node servers according to the real-time bandwidth demand, bandwidth costs of the node servers, and the target client available bandwidth comprises:
selecting in succession, by the resource scheduling system, bandwidth carrying nodes in the node servers in order of the bandwidth costs from low to high;
when a sum of target client available bandwidths in selected bandwidth carrying nodes is greater than the real-time bandwidth demand, determining, by the resource scheduling system, the bandwidth carrying nodes as the target node server.

* * * * *